United States Patent [19]

Baumann

[11] 4,170,600
[45] Oct. 9, 1979

[54] THIOCYANOMETHYL SUBSTITUTED ANTHRAQUINONE DISPERSE DYES

[75] Inventor: Werner Baumann, Therwil, Switzerland

[73] Assignee: Sandoz Ltd., Basel, Switzerland

[21] Appl. No.: 910,826

[22] Filed: May 30, 1978

[30] Foreign Application Priority Data

Jun. 2, 1977 [CH] Switzerland .................... 6787/77

[51] Int. Cl.$^2$ .................. C09B 1/50; C07C 97/26; C09B 1/515

[52] U.S. Cl. .................. 260/380; 260/378; 260/383; 8/39 R; 8/39 B; 8/39 C; 8/40

[58] Field of Search .................. 260/380, 378, 383

[56] References Cited

U.S. PATENT DOCUMENTS

| | | | |
|---|---|---|---|
| 3,502,423 | 3/1970 | Buecheler | 260/380 |
| 3,538,129 | 11/1970 | Sato et al. | 260/380 |
| 3,694,467 | 9/1972 | Maier | 260/380 |

FOREIGN PATENT DOCUMENTS

| | | | |
|---|---|---|---|
| 997651 | 7/1965 | United Kingdom | 260/380 |
| 1311587 | 3/1973 | United Kingdom | |

OTHER PUBLICATIONS

The Chemsity of Synthetic Dyes, J. M. Straley, p. 408, Academic Press N.Y. 1970.

*Primary Examiner*—Thomas Waltz
*Assistant Examiner*—Raymond K. Covington
*Attorney, Agent, or Firm*—Gerald D. Sharkin; Richard E. Vila; Thomas C. Doyle

[57] ABSTRACT

The present invention relates to disperse dyestuffs of the anthraquinone series which contain at least one group of formula —Y—CH$_2$(SCN) where Y is a mono- or binuclear aryl group, which dyestuffs are useful for dyeing or printing textile substrates consisting of or comprising synthetic or semi-synthetic, hydrophobic high molecular weight organic materials.

11 Claims, No Drawings

THIOCYANOMETHYL SUBSTITUTED ANTHRAQUINONE DISPERSE DYES

The present invention relates to anthraquinone compounds, their production and use.

Accordingly, the present invention provides disperse dyestuffs of the anthraquinone series which contain at least one group of formula —Y—CH$_2$(SCN) where Y is a mono- or binuclear aryl group.

The mono- or binuclear aryl groups of interest are naphthyl and optionally substituted phenyl groups.

Preferably the group Y is bound to the anthraquinone nucleus through —O—, —S— or optionally substituted amino, for example —NR$_3$ wherein R$_3$ is as defined below.

Of particular interest are disperse dyestuffs of the anthraquinone series in which at least one group of formula

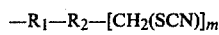

—R$_1$—R$_2$—[CH$_2$(SCN)]$_m$ in which each R$_1$, independently, is —O—, —S— or —NR$_3$—,
each R$_2$, independently, is unsubstituted phenylene, phenylene which is substituted by up to 2 substituents selected from hydroxyl, (C$_{1-2}$)alkyl, (C$_{1-2}$)alkoxy, chlorine and bromine; or unsubstituted naphthylene,
R$_3$ is hydrogen; (C$_{1-4}$)alkyl; or (C$_{1-4}$)alkyl monosubstituted by (C$_{1-2}$)alkoxy;
m is 1, 2 or 3, is bound to the anthraquinone nucleus.

In particular, the present invention provides compounds of formula I,

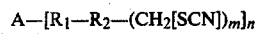

A—[R$_1$—R$_2$—(CH$_2$[SCN])$_m$]$_n$    I in which

A is an anthraquinone nucleus which contains at least one auxochromic substituent selected from —NH$_2$ and hydroxy in the 1-, 4-, 5- and/or 8- positions and which is optionally further substituted by up to two substituents selected from the group consisting of —NH$_2$, (C$_{1-6}$)alkylamino, di(C$_{1-4}$)alkylamino, phenylamino, N-(C$_{1-4}$)alkyl-N-phenylamino, (C$_{5-7}$)cycloalkylamino, benzoylamino, hydroxyl, (C$_{1-2}$)alkoxy, mercapto, (C$_{1-6}$)alkylmercapto, phenylmercapto, chlorine, bromine, nitro and cyano,
m is as defined above,
n is 1 or 2, and
R$_1$, R$_2$ and R$_3$ are as defined above.

Where the anthraquinone nucleus is optionally further substituted such substituents are preferably selected from the group consisting of —NH$_2$, (C$_{1-4}$)alkylamino, phenylamino, (C$_{5-7}$)cycloalkylamino (preferably cyclohexylamino), hydroxyl, chlorine and bromine.

In the compounds of formula I, when any R$_1$ is —NR$_3$—, R$_3$ is preferably hydrogen.

Preferred compounds of formula I are those of formula Ia,

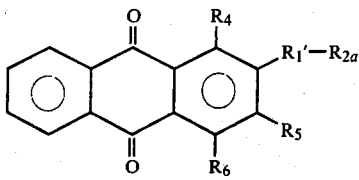

in which

R$_1$' is —O— or —S—,
R$_{2a}$ is unsubstituted phenyl; phenyl substituted by a single CH$_2$(SCN) group; phenyl substituted by up to two substituents selected from the group consisting of hydroxyl, (C$_{1-2}$)alkyl, (C$_{1-2}$)alkoxy, chlorine and bromine; or phenyl which is substituted by a single CH$_2$(SCN) group and up to two further substituents selected from hydroxyl, (C$_{1-2}$)alkyl, (C$_{1-2}$)alkoxy, chlorine and bromine,
R$_4$ is OH or NH$_2$,
R$_5$ is hydrogen, chlorine or bromine,
R$_6$ is —OH or —NHR$_7$,
R$_7$ is hydrogen, (C$_{1-6}$)alkyl, (C$_{5-7}$)cycloalkyl or

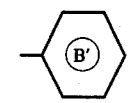

in which the ring B is unsubstituted or is substituted by up to two substituents selected from hydroxyl, (C$_{1-2}$)alkyl, (C$_{1-2}$)alkoxy, chlorine and bromine; or the ring B is substituted by a single —CH$_2$(SCN) group and optionally further substituted by up to two substituents selected from hydroxy(C$_{1-2}$)alkyl, (C$_{1-2}$)alkoxy, chlorine and bromine, with the proviso that the molecule contains at least one —CH$_2$(SCN) group.

In the compounds of formula Ia, any phenyl as R$_{2a}$ and the phenyl ring B, in addition to any —CH$_2$(SCN) group, is preferably further unsubstituted or further monosubstituted. More preferably any such phenyl which bears a —CH$_2$(SCN) group is further unsubstituted.

In the compounds of formula Ia there is preferably only one CH$_2$(SCN) group, with those compounds where such group is bound to the phenyl ring as R$_{2a}$ being most preferred.

R$_1$' is preferably —O—.

R$_{2a}$ is preferably R$_{2a}$' where R$_{2a}$' is phenyl which in addition to a single —CH$_2$(SCN) group thereon bears no further substituent or is phenyl which bears no —CH$_2$(SCN) group and is unsubstituted or monosubstituted by chlorine, bromine, hydroxy, methyl, methoxy, ethyl or ethoxy. More preferably R$_{2a}$ is R$_{2a}$'', where R$_{2a}$'' is phenyl which bears a single —CH$_2$(SCN) group and is further unsubstituted.

R$_5$ is preferably hydrogen.
R$_6$ is preferably hydroxyl.
R$_7$ is preferably R$_7$', where R$_7$' is hydrogen, (C$_{1-6}$) alkyl, (C$_{5-7}$)cycloalkyl or where the ring B' bears a —CH₂(SCN) group and is further unsubstituted or the ring B' bears no —CH₂(SCN) group and is unsubstituted or monosubstituted by chlorine, bromine, hydroxyl, methyl, methoxy, ethyl or ethoxy. More preferably $R_7$ is $R_7''$, where $R_7''$ is hydrogen, $(C_{1-6})$alkyl or $(C_{5-7})$cycloalkyl.

Preferred compounds of formula Ia are those wherein $R_{2a}$ is $R_{2a}'$, $R_5$ is hydrogen, $R_7$ is $R_7'$ and the molecule contains a single CH₂(SCN) group.

More preferred compounds of formula Ia are those wherein $R_{2a}$ is $R_{2a}''$, $R_5$ is hydrogen and $R_7'$ is $R_7''$.

Even more preferred compounds of formula Ia are those wherein $R_1'$ is —O—, $R_{2a}$ is $R_{2a}''$, $R_5$ is hydrogen and $R_6$ is hydroxyl or $-NHR_7''$.

Most preferred compounds of formula Ia are those wherein $R_1'$ is —O—, $R_{2a}$ is $R_{2a}''$, $R_5$ is hydrogen and $R_6$ is hydroxyl, especially that wherein $R_4$ is —NH₂.

The present invention also provides a process for the production of disperse dyestuffs of the anthraquinone series which contain at least one group of formula —Y—CH₂(SCN) where Y is as defined above, comprising reacting a corresponding anthraquinone compound which contains at least one group of formula —Y—CH₂X
in which Y is as defined above, and X is chlorine, bromine or a methane-, benzene-, 4-chlorobenzene or para-toluenesulphonate group,
with thiocyanic acid or a salt thereof.

Preferably X is chlorine.

Preferably a salt of thiocyanic acid is employed. The preferred compounds being ammonium thiocyanate or an alkali metal thiocyanate, especially sodium or potassium thiocyanate.

The process is preferably carried out in a polar solvent, for example in alcohols which have a boiling point of c. 100° C. or above, in dimethylformamide, dimethylsulphoxide, sulpholane, N-methylpyrrolidone etc. The reaction is conveniently effected at a temperature from room temperature up to 130° C. approximately.

The anthraquinone starting materials may be prepared in accordance with known methods from available compounds, preferably by chloromethylation of a corresponding aryl-containing anthraquinone compound.

The disperse dyes according to the present invention may be made up into dyestuff preparations in accordance with known methods, for example by grinding in the presence of dispersing agents and/or fillers optionally with subsequent vacuum or spray drying.

The dyestuffs of the present invention when made up into dyeing preparations are useful for pad dyeing, exhaust dyeing or printing textile substrates consisting of or comprising synethetic or semi-synthetic, hydrophobic high molecular weight organic materials. Preferred substrates are those which consist of linear, aromatic polyesters, cellulose 2½ acetate, cellulose triacetate or synthetic polyamides. Dyeing or printing may be effected in accordance with known methods.

The dyeings obtained are especially level and possess notable fastnesses, especially light-, thermofixation-, sublimation- and pleating-fastnesses.

The following Examples further serve to illustrate the present invention. In the Examples, all parts are parts by weight and all temperatures are in degrees Centigrade.

EXAMPLE 1

10 parts of 1-amino-2-(4'-chloromethylphenoxy)-4-hydroxy-anthraquinone, obtained by chloromethylation in accordance with known methods of 1-amino-2-phenoxy-4-hydroxy anthraquinone, and 5 parts of sodium thiocyanate in 50 parts of dimethylformamide are heated to 60° with stirring. After 1 hour the reaction mixture is allowed to cool to room temperature and poured into 300 parts of methanol. The precipitated product of formula

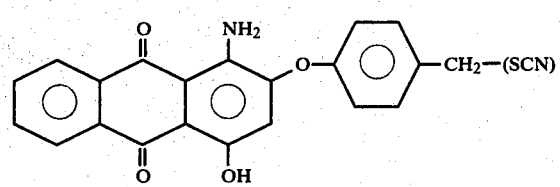

is filtered, washed with methanol, washed with water and dried in vacuum.

In the following Table further dyestuffs which may be prepared in analogy with the procedure described in Example 1 are given. The dye shade on polyester is also indicated.

Table 1
The dyes correspond to formula Ia in which $R_{2a}$ is

—⟨◯⟩—CH₂(SCN).

| Ex. No. | $R_1'$ | $R_4$ | $R_5$ | $R_6$ | Shade on polyester |
|---|---|---|---|---|---|
| 2 | —S— | —NH₂ | —H | —OH | violet |
| 3 | —O— | —OH | —H | —OH | orange |
| 4 | —S— | —OH | —H | —OH | scarlet |
| 5 | —O— | —NH₂ | —H | —NH₂ | violet |
| 6 | —O— | —NH₂ | —Cl | —NH₂ | " |
| 7 | —O— | —NH₂ | —Br | —NH₂ | " |
| 8 | —S— | —NH₂ | —H | —NH₂ | blue |
| 9 | —O— | —NH₂ | —H | —NH—CH₃ | violet |
| 10 | —O— | —NH₂ | —H | —NH—CH(CH₃)₂ | " |
| 11 | —O— | —NH₂ | —H | —NH—⟨H⟩ | " |
| 12 | —S— | —NH₂ | —H | —NH—C₂H₅ | blue |
| 13 | —S— | —NH₂ | —H | —NH—CH(CH₃)C₂H₅ | " |
| 14 | —S— | —NH₂ | —H | —NH—⟨H⟩ | " |
| 15 | —O— | —NH₂ | —Cl | —OH | red |
| 16 | —O— | —NH₂ | —Br | —OH | " |
| 17 | —O— | —NH₂ | —H | —NH—(CH₂)₅CH₃ | violet |
| 18 | —O— | —NH₂ | —H | —NH—Cyclopentyl | " |
| 19 | —O— | —NH₂ | —H | —NH—Cycloheptyl | " |

In the following Table 2, further dyestuffs which may be prepared in analogy with the procedure described in Example 1 are given. The dyes correspond to the formula

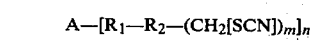

| Ex. No. | R$_8$ | R$_6$ | Shade on polyester |
|---|---|---|---|
| 20 | —C$_6$H$_4$—CH$_2$(SCN) | —NH—C$_6$H$_3$(OCH$_3$)(CH$_2$(SCN)) | blue |
| 21 | —C$_6$H$_5$ | " | " |
| 22 | —C$_6$H$_4$—Cl | " | " |
| 23 | —C$_6$H$_4$—Br | " | " |
| 24 | —C$_6$H$_4$—CH$_3$ | " | " |
| 25 | —C$_6$H$_4$—C$_2$H$_5$ | " | " |
| 26 | —C$_6$H$_4$—OCH$_3$ | " | " |
| 27 | —C$_6$H$_4$—OC$_2$H$_5$ | " | " |
| 28 | —C$_6$H$_4$—CH$_2$(SCN) | —NH—C$_6$H$_4$—CH$_3$ | " |
| 29 | " | —NH—C$_6$H$_4$—Cl | " |
| 30 | naphthyl-CH$_2$(SCN) | —OH | red |
| 31 | —C$_6$H$_3$(OH)(CH$_2$(SCN)) | —OH | " |

APPLICATION EXAMPLE

7 Parts of the dyestuff of Example 1 are ground with 13 parts of sodium lignin sulphonate, 25 parts water and 100 parts of silica quartz beads until the average particle size is less than 1μ. The suspension is then filtered, dried under mild conditions and pulverised. 4 Parts of the dyestuff preparation so obtained are added to a dyebath containing 4000 parts water at 60°, the dyebath having been buffered to pH 5. 100 Parts of polyester fibre are dyed at 98° for 1 hour in the dyebath with the addition of 20 parts orthophenylphenol. After cooling, rinsing, soaping, rinsing again and drying a brilliant level red dyeing is obtained.

What is claimed is:

1. An anthraquinone disperse dyestuff which contains at least one group of formula —Y—CH$_2$(SCN) where Y is a mono- or binuclear aryl group.

2. A disperse dyestuff according to claim 1, in which at least one group of formula $$—R_1—R_2—[CH_2(SCN)]_m$$

in which each R$_1$, independently, is —O—, —S— or —NR$_3$—,
each R$_2$, independently, is unsubstituted phenylene, phenylene which is substituted by up to 2 substituents selected from hydroxyl, (C$_{1-2}$)alkyl, (C$_{1-2}$)alkoxy, chlorine and bromine; or unsubstituted naphthylene,
R$_3$ is hydrogen; (C$_{1-4}$)alkyl or (C$_{1-4}$)alkyl monosubstituted by (C$_{1-2}$)alkoxy,
m is 1, 2 or 3, is bound to the anthraquinone nucleus.

3. A compound of formula I, $$A—[R_1—R_2—(CH_2[SCN])_m]_n \qquad \text{I}$$

in which

A is an anthraquinone nucleus which contains at least one auxochromic substituent selected from —NH$_2$ and hydroxy in the 1-, 4-, 5- and/or 8-positions and which is optionally further substituted by up to two substituents selected from the group consisting of —NH$_2$, (C$_{1-6}$)alkylamino, di(C$_{1-4}$)alkylamino, phenylamino, N-(C$_{1-4}$)alkyl-N-phenylamino, (C$_{5-7}$)cycloalkylamino, benzoylamino, hydroxyl, (C$_{1-2}$)alkoxy, mercapto, (C$_{1-6}$)alkylmercapto, phenylmercapto, chlorine, bromine, nitro and cyano,
each R$_1$, independently, is —O—, —S— or —NR$_3$—,
each R$_2$, independently, is unsubstituted phenylene, phenylene which is substituted by up to 2 substituents selected from hydroxyl, (C$_{1-2}$)alkyl, (C$_{1-2}$)alkoxy, chlorine and bromine; or unsubstituted naphthylene,
R$_3$ is hydrogen; (C$_{1-4}$)alkyl or (C$_{1-4}$)alkyl monosubstituted by (C$_{1-2}$)alkoxy,
m is 1, 2 or 3, and
n is 1 or 2.

4. A compound according to claim 3, of formula Ia,

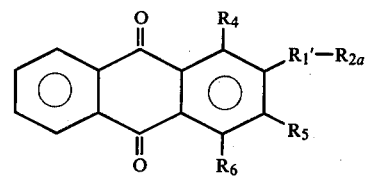

in which

R$_1'$ is —O— or —S—,
R$_{2a}$ is unsubstituted phenyl; phenyl substituted by a single —CH$_2$(SCN) group; phenyl substituted by up to two substituents selected from the group consisting of hydroxyl, (C$_{1-2}$)alkyl, (C$_{1-2}$)alkoxy, chlorine and bromine; or phenyl which is substituted by a single —CH$_2$(SCN) group and up to two further substituents selected from hydroxyl, (C$_{1-2}$)alkyl, (C$_{1-2}$)alkoxy, chlorine and bromine,
R$_4$ is OH or NH$_2$,
R$_5$ is hydrogen, chlorine or bromine,
R$_6$ is —OH or —NHR$_7$,
R$_7$ is hydrogen, (C$_{1-6}$)alkyl, (C$_{5-7}$)cycloalkyl or

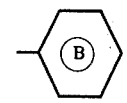

in which the ring B is unsubstituted or is substituted by up to two substituents selected from hydroxyl, (C$_{1-2}$)alkyl, (C$_{1-2}$)alkoxy, chlorine and bromine; or the ring B is substituted by a single —CH$_2$(SCN) group and optionally further substituted by up to two substituents selected from hydroxy($C_{1-2}$)alkyl, ($C_{1-2}$)alkoxy, chlorine and bromine,
with the proviso that the compound contains at least one —$CH_2$(SCN) group.

5. A compound according to claim 4, in which $R_{2a}$ is $R_{2a}'$, where $R_{2a}'$ is phenyl which in addition to a single —$CH_2$(SCN) group thereon bears no further substituent or is phenyl which bears no —$CH_2$(SCN) group and is unsubstituted or monosubstituted by chlorine, bromine, hydroxy, methyl, methoxy, ethyl or ethoxy, $R_5$ is hydrogen, $R_7$ is $R_7'$, where $R_7'$ is hydrogen, ($C_{1-6}$)alkyl, ($C_{5-7}$)cycloalkyl or

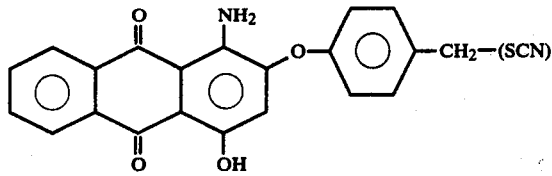

where the ring B' bears a —$CH_2$(SCN) group and is further unsubstituted or the ring B' bears no —$CH_2$(SCN) group and is unsubstituted or monosubstituted by chlorine, bromine, hydroxyl, methyl, methoxy, ethyl or ethoxy, and the compound contains a single —$CH_2$(SCN) group.

6. A compound according to claim 5, in which $R_{2a}$ is $R_{2a}''$, where $R_{2a}''$ is phenyl which bears a single —$CH_2$(SCN) group and is further unsubstituted, and $R_7$ is $R_7''$, where $R_7''$ is hydrogen, ($C_{1-6}$)alkyl or ($C_{5-7}$)cycloalkyl.

7. A compound according to claim 6, in which $R_1'$ is —O— and $R_6$ is hydroxyl or —$NHR_7''$ where $R_7''$ is as defined in claim 6.

8. A compound according to claim 5, of formula

9. A process for pad dyeing, exhaust dyeing or printing a substrate comprising synthetic or semisynthetic, hydrophobic high molecular weight organic material which comprises applying to said substrate a dyestuff defined in claim 1.

10. A process according to claim 9, in which the substrate consists of linear, aromatic polyesters, cellulose 2½ acetate, cellulose triacetate or synthetic polyamides.

11. A process for pad dyeing, exhaust dyeing or printing a substrate or synthetic or semi-synthetic, hydrophobic high molecular weight organic material which comprises applying thereto a dyestuff defined in claim 4.

* * * * *